Patented July 22, 1930

1,771,307

UNITED STATES PATENT OFFICE

GEORGE NEWBERY, OF SURREY, ENGLAND, ASSIGNOR TO MAY & BAKER LIMITED, OF LONDON, ENGLAND, A BRITISH COMPANY

MANUFACTURE OF AROMATIC ARSENIC COMPOUNDS CONTAINING AN ISOXAZINE RING

No Drawing. Application filed June 27, 1927, Serial No. 201,970, and in Great Britain July 8, 1926.

The present invention is for the manufacture of aromatic compounds of arsenic comprising an isoxazine ring, that is, compounds containing arsenic directly linked to a carbon atom of an aryl nucleus in an arylisoxazine ring system.

The invention has particular reference to the manufacture of arsenic derivatives of the 1:4-benzisoxazine ring; and comprises the manufacture of benzisoxazine arsinic acids, and arseno-bis-benzisoxazine compounds.

According to the present invention, aromatic compounds of arsenic comprising an isoxazine ring are manufactured by reducing an o-nitro-aryloxyacetic acid arsenic derivative, that is such a derivative wherein there is a nitro and an oxyacetic acid group in adjacent positions in the aryl nucleus, for example, o-nitro-phenoxyacetic acid arsinic acid.

Depending on the conditions of the reduction, such as temperature and concentration of the reagents, and particularly on the reducing agent selected, the reduction may be effected so as to obtain as desired either an arylisoxazine arsenic compound, or an arseno-bis-arylisoxazine derivative.

It follows that since the last type of product is in a lower state of oxidation than the second, and the second in turn in a lower state of oxidation than the initial compound, the second compound may be prepared from the first, and the third either from the first or the second, by appropriate adjustment of the reduction conditions; and hence the reaction may be effected in separate stages, with isolation of the first-formed product, or may be carried through from the beginning as an integral one-stage process to the formation of the arseno compound.

For example, when o-nitro-phenoxyacetic acid arsinic acid is reduced with a suitable mild reducing agent, such, for example, as ferrous hydroxide or glucose in an alkaline medium, instead of the 2-amino-phenoxyacetic acid arsinic acid which might be expected, there is produced, by elimination of a molecule of water, a 3-hydroxy-1:4-benzisoxazine arsinic acid. On the other hand, if a more powerful reducing agent, such as sodium hydrosulphite or hypophosphorous acid be used, there may be directly obtained the corresponding arsenobis-(3-hydroxy-1:4-benzisoxazine). In further alternative, this latter compound may also be obtained from the 3-hydroxy-1:4-benzisoxazine arsinic acid after separation and appropriate purification as may prove desirable.

Thus, in particular, there are obtained from 2-nitro-phenoxyacetic acid 4-arsinic acid (Christiansen: J. A. C. S. 44; 1922. 2239) by reduction with (a) ferrous hydroxide or glucose in an alkaline medium, 3-hydroxy-1:4-benzisoxazine-6-arsinic acid; and by reduction with (b) sodium hydrosulphite, 6-6'-arseno-bis-(3-hydroxy-1:4-benzisoxazine). This latter compound is also obtainable directly from the 2-nitro-phenoxyacetic acid-4-arsinic acid by reduction with sodium hydrosulphite. Both the intermediate and the final benisoxazine derivatives possess valuable therapeutic properties for the treatment of trypanosomiasis and like parasitic diseases.

It is to be appreciated that the o-nitroaryloxyacetic acid arsenic compounds may be further substituted in the nucleus, and also that the term embraces equivalent compounds derived from acetic acid substituted in the $\alpha$ position and their reducible equivalents, such as the esters or the amide. Hence, 2-alkyl- or 2-aryl-isoxazines or -isoxazones may be prepared according to the invention.

The following are example of ways in which the invention may be carried into effect, but it will be appreciated that these examples are given for illustrative purposes and that the invention is not limited thereby.

Example I 400 grams of ferrous sulphate ($FeSO_4$ $7H_2O$) are mixed with 400 cc. of hot water, and the mixture incorporated with a solution of caustic soda prepared from 300 grams of sodium hydrate in 400 cc. of water. This alkaline ferrous hydroxide paste is cooled to about 30 or 40° C., and there are then added thereto, with mechanical stirring, 64 grams of 2-nitrophenoxyacetic acid-4-arsinic acid dissolved in 400 cc. of a twice-normal solution of sodium carbonate. After about one hour, the ferric hydroxide is removed by filtration, and the filtrate is acidified with hydrochloric acid. There is obtained a crystalline product which has been proved to be 3-hydroxy-1:4-benzisoxazine-6 arsinic acid. It is a substance insoluble in acids but soluble in alkali carbonates and hydroxides; and a sodium salt yielding a neutral solution which is suitable for injection is readily obtained.

The reaction may be represented by the following structural formulæ:

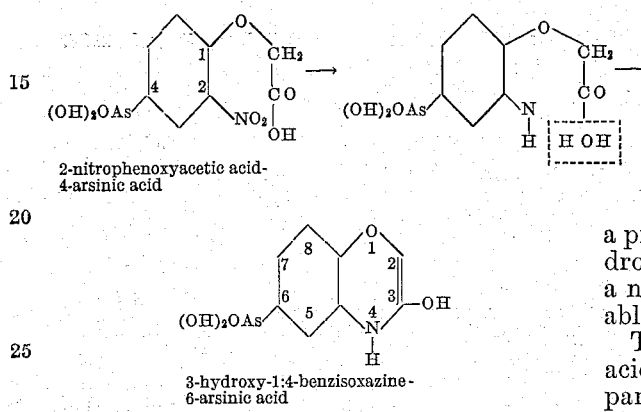

3-hydroxy-1:4-benzisoxazine-6-arsinic acid

Example II 27 grams of 3-hydroxy-1:4-benzisoxazine-6-arsinic acid are prepared according to the preceding example, and then dissolved in 200 cc. of water with the aid of 50 cc. of a twice-normal solution of sodium carbonate, and the solution of the acid so obtained is added to a cooled solution in 2 litres of water of 30 grams of magnesium chloride hexahydrate and 100 grams of sodium hydrosulphite. The mixture is rapidly filtered, and the filtrate is warmed for one to two hours at a temperature of 60° C. The light yellow product which separates is filtered off, washed and dried, and has been proved to be 6-6'-arseno-bis-(3-hydroxy-1:4-benzisoxazine). It is a product insoluble in alkalies and in acids.

The reaction may be represented by the following structural formulæ:

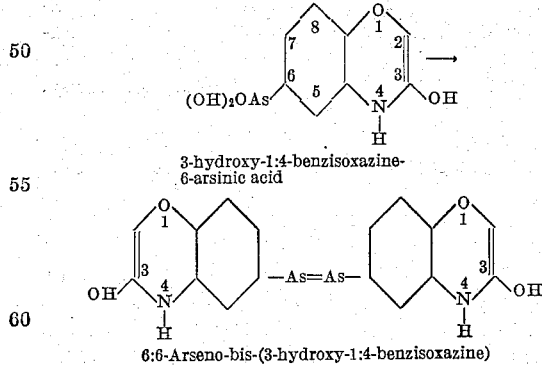

6:6-Arseno-bis-(3-hydroxy-1:4-benzisoxazine)

Example III

An alkaline ferrous hydroxide paste is prepared by mixing 700 grams of crystallized ferrous sulphate with 700 cc. of water and a solution of 280 grams of caustic soda in 400 cc. of water. To this paste, cooled to about 30 to 40° C., are added 130 grams of 6-acetylamino-2-nitro-phenoxyacetic acid-4-arsenic acid dissolved in 700 cc. of a twice-normal solution of sodium carbonate. After removal of ferric hydroxide and acidification of the reaction mixture as in Example I, there is obtained a crystalline substance, which has been proved to be 8-acetylamino-3-hydroxy-1:4-benzisoxazine-6-arsinic acid, a product soluble in alkali carbonates and hydroxides but insoluble in acids, and yielding a neutral sodium salt whose solution is suitable for administration by injection.

The 6-acetylamino-2-nitro-phenoxyacetic acid-4-arsinic acid may be conveniently prepared by the action of chloracetic acid on 3-nitro-4-hydroxy-5-acetylamino-phenylarsinic acid, with appropriate removal of the liberated hydrochloric acid under such conditions as to prevent the reaction becoming either so acid or alkaline as to result in hydrolysis of the reaction product. Such conditions may be realized by the addition of sodium bicarbonate as an acid reaction develops.

The 3-nitro-4-hydroxy-5-acetylamino-phenylarsinic acid may in its turn be obtained by the nitration of 3-acetylamino-4-hydroxyphenylarsinic acid under the usual conditions.

Example IV 33 grams of 8-acetylamino-3-hydroxy-1:4-benzisoxazine-6-arsinic acid are first prepared from 6-acetyl amino, 2-nitro-phenoxy acetic acid 4-arsinic acid by reduction with ferrous hydroxide paste as hereinbefore described and are suspended in 200 cc. of water, and the suspension dissolved by appropriate addition of a twice-normal solution of sodium carbonate. The solution so obtained is added to a solution in 2 litres of water of 30 grams of magnesium chloride hexahydrate and 100 grams of sodium hydrosulphite, the mixture filtered, and the filtrate warmed for one to two hours at 50 to 60° C. A yellow product, insoluble in acids and alkalies, separates, and has been proved to be 6-6'-arseno-bis-(8-acetylamino-3-hydroxy-1:4-benzisoxazine).

I claim:

1. Process of manufacture of aromatic compounds of arsenic containing an isoxazine ring, which comprises reducing an arylarsenic compound containing a nitro-group and an oxyacetic acid-group in adjacent positions in the aryl nucleus.

2. Process of manufacture of aromatic compounds of arsenic containing an isoxazine ring, which comprises reducing an arylarsenic compound containing a nitro-group and an oxyacetic acid-group in adjacent positions in the aryl nucleus under mild conditions of reduction to result in the nitro-group only of the initial compound being attacked with the formation of the isoxazine ring.

3. Process of manufacture of aromatic compounds of arsenic containing an isoxazine ring, which comprises reducing an arylarsenic compound containing a nitro-group and an oxyacetic acid-group in adjacent positions in the aryl nucleous under mild conditions of reduction to result in the nitro-group only of the initial compound being attacked with the formation of the isoxazine ring and reducing the resulting isoxazine derivative under energetic conditions to give the corresponding arseno-bis-arylisoxazine.

4. Process of manufacture of aromatic compounds of arsenic containing an isoxazine ring, which comprises reducing an arylarsenic compound containing in adjacent positions in the aryl nucleus, a nitro-group and an oxyacetic acid-group derived from an $\alpha$-substituted acetic acid.

5. Process of manufacture of aromatic compounds of arsenic containing an isoxazine ring, which comprises reducing an arylarsenic compound containing in adjacent positions in the aryl nucleus, a nitro-group and an oxyacetic acid-group derived from an $\alpha$-substituted acetic acid, the conditions of reduction being such as to result in the formation of an arylisoxazine arsenic derivative.

In testimony whereof I affix my signature.

GEORGE NEWBERY.